United States Patent Office 3,505,113
Patented Apr. 7, 1970

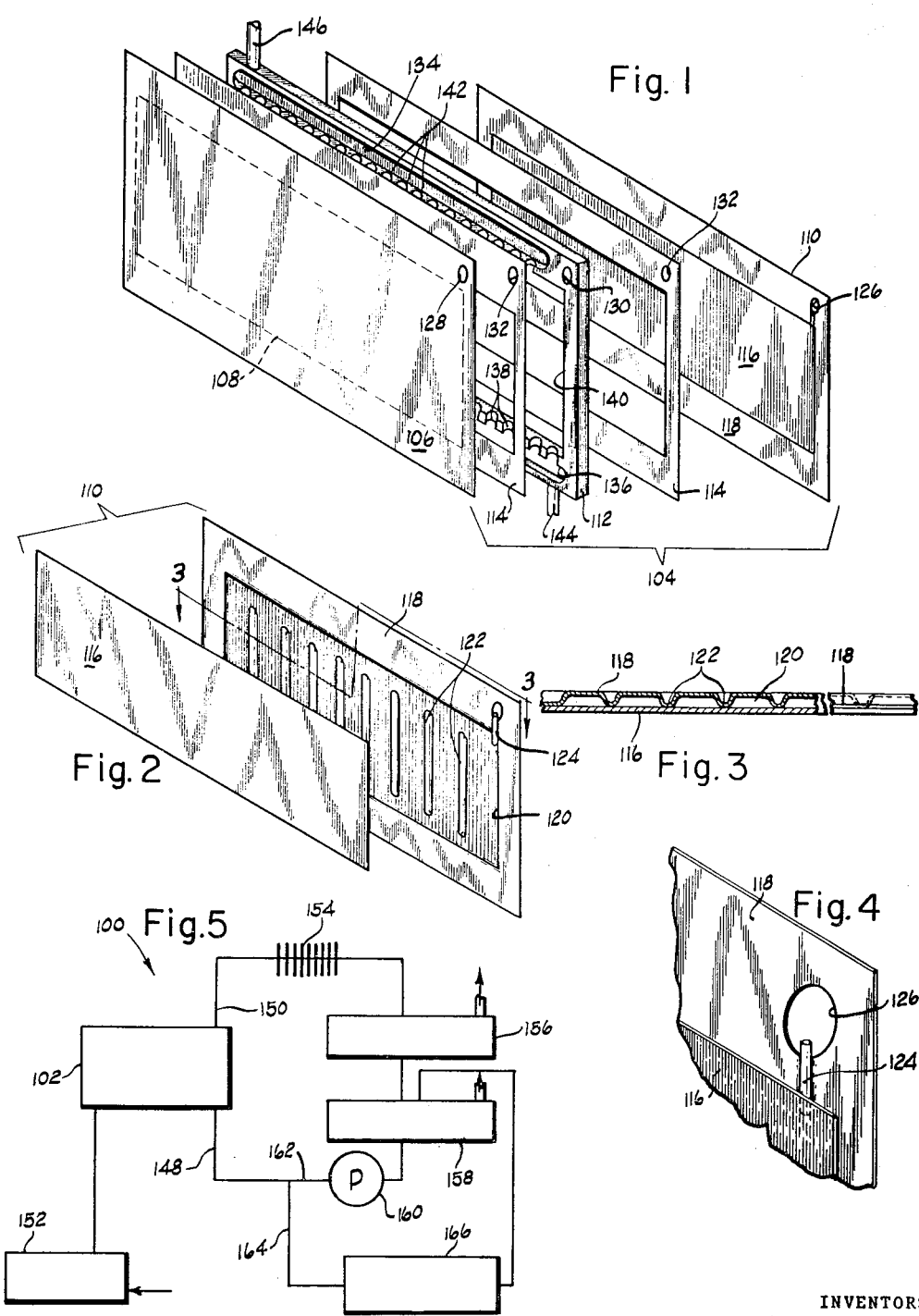

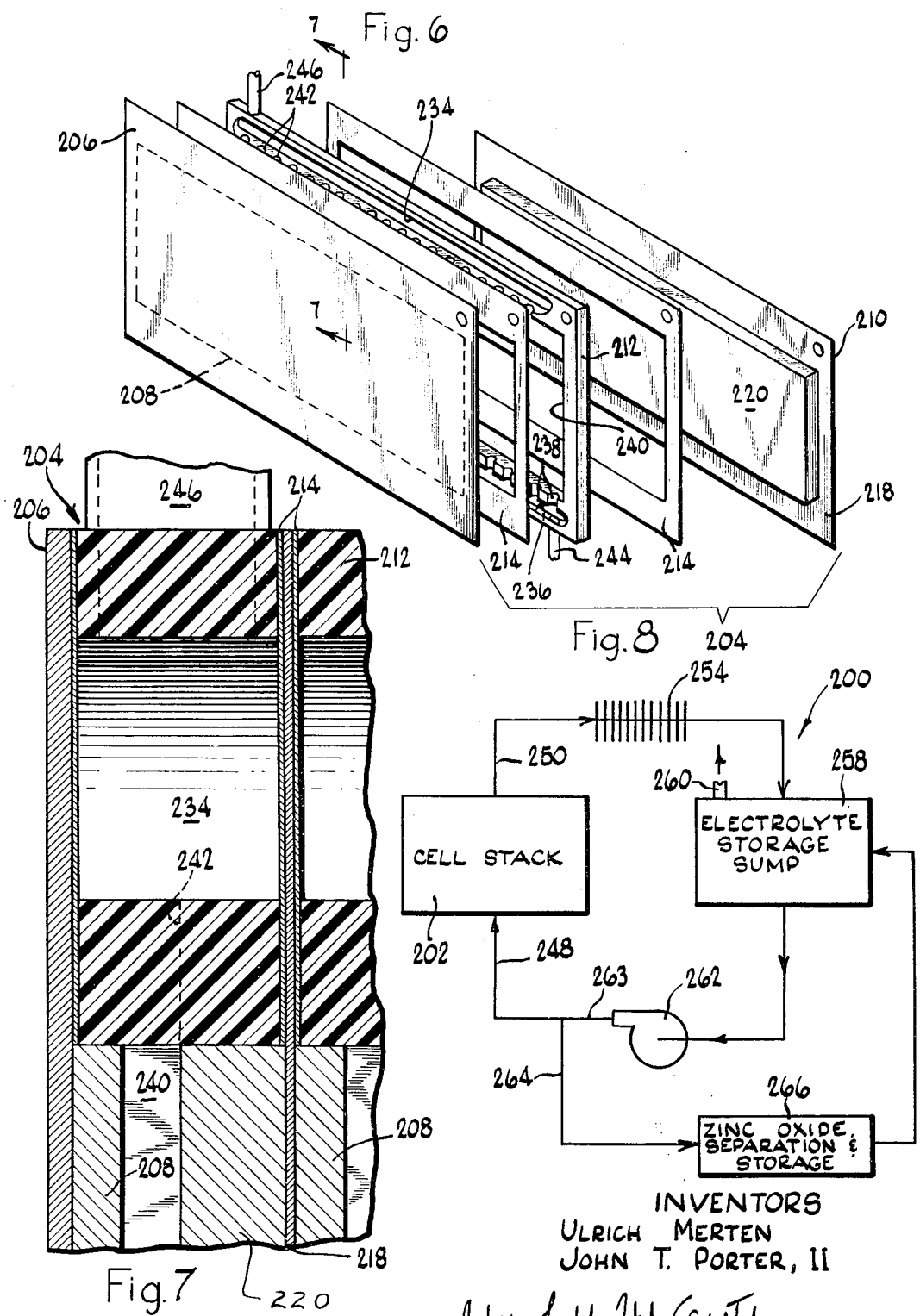

3,505,113
RECHARGEABLE ENERGY
CONVERSION PROCESS
Ulrich Merten and John T. Porter II, Del Mar, Calif., assignors to Gulf General Atomic Incorporated, San Diego, Calif., a corporation of Delaware
Continuation-in-part of application Ser. No. 525,815, Jan. 14, 1966. This application Nov. 22, 1967, Ser. No. 685,136
The portion of the term of the patent subsequent to Dec. 19, 1984, has ben disclaimed
Int. Cl. H01m 43/04, 43/02, 47/00
U.S. Cl. 136—28     3 Claims

ABSTRACT OF THE DISCLOSURE

A rechargeable energy conversion system utilizing zinc anodes and oxygen-providing cathodes, such as nickel hydroxide cathodes. An aqueous alkali metal hydroxide electrolyte is circulated through the electrochemical cells and then exterior thereof where it is cooled. The circulating electrolyte removes the zinc oxide reaction products from the cells during discharge and these reaction products are separated from the electrolyte stream and stored exterior of the cells until the system is recharged.

---

This application is a continuation-in-part of our application Ser. No. 525,815, filed Jan. 14, 1966, now U.S. Patent No. 3,359,136, which is a continuation-in-part of Ser. No. 259,016, now abandoned, filed Feb. 18, 1963.

This invention relates to storage batteries and more specifically to improved rechargeable energy conversion systems.

One general class of conventional storage batteries employ a lead-lead dioxide electrochemical couple and are commonly referred to as lead-acid batteries. Such storage batteries have found wide acceptance, particularly for starting in automobiles, but are not particularly desirable for use as a motive power source, as for traction purposes, where space and weight limitations are present. In this connection, lead-acid storage batteries have a relatively low energy density, i.e., power output per pound of battery weight. A conventional lead-acid storage battery has a theoretical maximum energy density of 76 watt hours per pound of reactants and produces 5 to 20 watt hours per pound of total battery weight in practice. The low power output per unit weight is primarily due to the high molecular weight of the reactants and to the rather large excesses of anodic and cathodic reactants required, since all of the electrodes cannot be completely consumed during the discharge of the battery. The lead-acid battery's reversibility is dependent upon the physical position of the reactants and decomposition products and requires the use of highly porous electrode plates to provide sufficient surface for the solid-solid reactions to take place.

It is a principal object of the present invention to provide a rechargeable electrochemical energy conversion system which has a high energy density. An additional object is to provide a rechargeable electrochemical energy conversion system which is easily and conveniently recharged. A further object is to provide a rechargeable electrochemical conversion system which has both a high energy density and a capability for supplying electrical power at a relatively high rate.

These and other objects of the invention are more particularly set forth in the following detailed description and in the accompanying drawings wherein:

FIGURE 1 is an exploded perspective view of an electrochemical cell assembly for use in a rechargeable energy conversion system;

FIGURE 2 is an exploded perspective view of one of the elements of FIGURE 1;

FIGURE 3 is sectional view taken along line 3—3 of FIGURE 2 showing the element in assembled condition;

FIGURE 4 is an enlarged fragmentary view of a portion of FIGURE 1;

FIGURE 5 is a diagrammatic view of a rechargeable energy conversion system employing a number of the electrochemical cells shown in FIGURES 1 to 4;

FIGURE 6 is a view similar to FIGURE 1 of an electrochemical cell assembly for a rechargeable energy conversion system of an alternate design to that shown in FIGURES 1 to 5;

FIGURE 7 is a fragmentary enlarged sectional view taken generally along line 7—7 of FIGURE 6 showing the cell assembly of FIGURE 6 in assembled condition; and FIGURE 8 is a diagrammatic view of an assembled rechargeable energy conversion system employing a number of the cells shown in FIGURES 6 and 7.

The rechargeable energy conversion systems disclosed in this specification utilize the zinc-oxygen electrochemical couple which has a relatively high theoretical capacity and a high utilization factor for the anodic and cathodic reactants. Zinc is the lightest, highly electropositive, solid element that can be plated in an undiluted state from an aqueous solution. Oxygen is a highly electropositive reactant and available from a variety of sources. The theoretical potential of the gaseous reaction $Zn + \frac{1}{2}O_2 \rightarrow ZnO$ is 1.65 volts.

Illustrated in FIGURES 1 to 5 is a rechargeable energy conversion system 100 which utilizes a cell stack 102 made up of a plurality of electrochemical cells 104 which are generally rectangular in shape and are held together in a stack by a plate and frame press (not shown). Each electrochemical cell comprises an anode support plate upon which a zinc anode is disposed, an electrolyte supply and discharge frame, and a composite integral cathode assembly.

In FIGURE 1, an electrochemical cell 104 which would be located at one end of a cell stack 102 is illustrated. The cell 104 contains a relatively heavy end plate 106 which supports the zinc anode 108 that is electroplated thereupon. A composite integral cathode assembly 110 forms the opposite end of the electrochemical cell 104, and a rectangular electrolyte supply and discharge frame 112 spaces the anode from the cathode. Interior passageways within the frame 112 provide for the supply of liquid electrolyte to the electrochemical cell and the discharge of it therefrom. A pair of gaskets 114, one on each side of the frame 112, assure that there is no leakage of fluid from the electrochemical cell 104.

The cathode assembly 110, in exploded condition, is shown in FIGURE 2 wherein it can be seen that it comprises a rectangular flat porous plate 116, made of a suitable inert material, such as mild steel. The porous plate 116 is preferably formed by pressing and sintering a suitable metal powder, such as carbonyl nickel powder, having a large surface area per unit weight. The center of the backing plate 118 is deformed to provide a generally rectangular plenum chamber 120 having dimensions slightly less than those of the porous plate 116. Additionally, a plurality of vertical ribs 122 are provided in the backing plate 118. Gas-tight connection between the backing plate 118 and the porous plate 116 is achieved in any suitable manner to provide a closed chamber therebetween, as by welding the thin backing plate to the porous plate along the periphery of the porous plate. The ribs 122 are also welded to the facing surface of the porous plate 116 thus providing good electrical connection between the overall surface of the porous plate 116 and the backing plate 118 and, in addition, preventing bowing due to the air pressure in the plenum chamber 120. The ribbed construction and the region that constitutes the plenum chamber 120 may best be seen in FIGURE 3.

The oxygen-containing gas is supplied to the plenum chamber 120 via an entrance passage at the upper right-hand corner (FIG. 2) of the composite cathode assembly 110. As best seen in FIG. 4, a short tube 124 is welded into a groove provided in the thin backing plate 118 in a location so that the lower end of the tube extends into the plenum chamber 120. The upper end of the tube 124 extends upward to a position where it is horizontally within the area of a hole 126 provided near the upper right-hand corner of the backing plate. As can be seen in FIGURE 1, this corner hole 126, in the assembled cell stack 102, is aligned with similar corner holes 128, 130 and 132 in the end plate 106, the electrolyte supply and discharge frame 112, and the gaskets 114, respectively. These aligned corner holes in the clamped-together cell stack 102 constitute the gas supply manifold through which a supply of oxygen-containing gas is fed to the plenum chambers 120 of each of the electrochemical cells 102. In this arrangement, all of the oxygen-containing gas that is supplied to the plenum chambers 120 of the individual electrochemical cells passes through the porous plates 116 and is either reacted as a part of the battery operation or is carried from the electrochemical cell via the circulating electrolyte stream.

In addition to providing one side of the plenum chamber 120 in the cathode assembly 110, the thin backing plates 118 also serve another function, that of supporting the zinc anode 108 for the next adjacent electrochemical cell. Thus, it can be seen that the bi-functional backing plates 118 serve to connect adjacent electrochemical cells together in series electrical contact by providing good electrical contact between the cathode of one cell and the anode of the next adjacent cell which is plated on the backing plate itself.

The electrolyte supply and discharge frame 112, which is made of a suitable material which is inert to the caustic electrolyte, such as polyethylene or polypropylene, contains a horizontal slot 134 and a horizontal slot 136 formed, respectively, in its upper and lower legs. The lower slot 136 is connected via a plurality of weep notches or holes 138 to the rectangular region 140 interior of this frame which serves as the electrolyte passageway for each individual cell 104. A like connection is provided between the interior region 140 and the upper slot 134 via weep notches or holes 142. An electrolyte supply tube 144 is connected to the lower slot 136, as by entering through the bottom face of the frame 112. An electrolyte discharge tube 146 is likewise connected, through the upper face of the frame 112, to the upper slot 134. As seen in FIG. 1, during operation each of the electrochemical cells 104 is constantly supplied with caustic electrolyte which enters through the tube 144, the elongated slot 136 and the weep holes 138 and exits from the upper portion of the cell through the weep holes 142, the elongated slot 134, and the discharge tube 146.

Preferably, a parallel flow of electrolyte is established through each of the electrochemical cells 104 in the cell stack 102. Accordingly, all of the electrolyte supply tubes 144 lead from a common conduit 148, shown in FIG. 5 as conduit 148, and all of the discharge tubes 146 likewise merge into a common conduit 150. To reduce the self-discharge of the series-connected electrochemical cells to an acceptably low level, the supply and discharge tubes 144 and 146 are made long enough to desirably lengthen the electrolytic path between adjacent cells via the electrolyte system. If it is desired to reduce resistance to flow of the electrolyte through the cell stack 102, more than one supply and discharge tube may be provided for each electrochemical cell 104.

In the diagrammatic view shown in FIG. 5, a 15-cell stack is illustrated which utilizes air as the oxygen-containing gas and an aqueous solution of potassium hydroxide as the electrolyte. An air compressor 152 supplies air from the atmosphere to each of the electrochemical cells 104 at a sufficient pressure so that air bubbles through the porous plates and into the electrolyte passageway in each cell. The electrolyte stream which exits from the 15-cell stack through the conduit 150 passes through a radiator means 154 which cools the electrolyte to remove most of the heat which is generated within the cell stack 102 as a part of the electrochemical operation. Next, the circulating discharge electrolyte stream passes into a gas-liquid separator 156 wherein separation of the nitrogen and unreacted oxygen of the air from the liquid electrolyte is accomplished. The separated gases are vented to the atmosphere, and the electrolyte is passed into a storage sump 158.

A pump 160 withdraws electrolyte from the sump 158 and continuously recirculates it through the 15-cell stack via the conduit 148. An outlet conduit 162 from the pump 160 branches into the conduit 148 which re-enters the cell stack 102 and the smaller conduit 164 which carries about 5% of the volume of the flow from the pump 160 to a zinc oxide separation and storage means 166. Any suitable means, such as those enumerated elsewhere in the application, may be employed which will separate the zinc oxide (which may be partially in the form of a zinc hydroxy complex) from the electrolyte and retain the zinc oxide. The electrolyte, depleted of most of the zinc oxide it carried, is returned to the sump 158. This continuous separation of zinc oxide from a portion of the electrolyte stream maintains the concentration of the zinc oxide reaction products in the electrolyte being recirculated to the cell stack at a sufficiently low level that it can adequately continue to remove the reaction products constantly being created in each cell. Of course, dependent upon the total volume of electrolyte used, the rate of flow of the electrolyte through the electrochemical cells, and the operating conditions of the cell stack 102, it may be desirable to divert a greater or a lesser percentage of the electrolyte stream for separation of reaction products.

During recharging, as in any storage or secondary battery, the direction of current flow is reversed (from that during discharge), and a voltage equal to about 2 volts for each of the electrochemical cells 104 in series connection is used for this purpose. During recharging, the electrolyte is circulated and recirculated through the cell stack 102 at about the same rate employed during discharge. The electrochemical reaction during recharging causes metallic zinc to be plated out on the end plate 106 and the backing plates 118, simultaneously depleting the zinc oxide content of the electrolyte stream. However, diversion of about the same portion of the electrolyte stream through the zinc oxide storage means 166 permits the depleted electrolyte to pick up additional zinc oxide so that there is always sufficient zinc oxide available in the electrolyte in the electrochemical cells to permit the rebuilding of the zinc anodes to be carried out at the desired rate. Of course, during recharging, it is not necessary to operate the air compressor because there is no need to supply oxygen; on the contrary, during the recharging of the cells oxygen is evolved from the surface of the porous electrode. This evolved oxygen is carried from the cell stack 102 by the circulating electrolyte stream and is separated from the liquid electrolyte in the gas-liquid separator 156.

EXAMPLE I

A rechargeable energy conversion system 100 is assembled using 60 individual zinc-oxygen electrochemical cells 104 which are connected in series electrical connection into four separate 15-cell stacks. These four separate cell stacks 102 are connected in parallel electrical connection.

Each of the individual zinc-oxygen cells is about 16" wide x 8" high and has a composite thickness of slightly over ¼". The composite integral cathode assembly 110 for each electrochemical cell 104 includes a porous plate 116 made of sintered carbonyl nickel powder, which plate is about 15¾" wide x 7¾" high x 0.04" thick. This porous plate is welded along its periphery to a thin backing plate 118 of 0.005" mild steel, which plate has deformed therein a plenum chamber 120 about 0.02" thick (see FIG. 3). A short tube 124 of 0.03" internal diameter is welded at the upper right-hand corner to serve as the entrance conduit to the plenum chamber 120.

The electrolyte supply and discharge frame 112 is injection-molded from polypropylene and is about ¼" thick and formed with the internal slots 134 and 136 and notches 138 and 142 that provide inlets and outlets for electrolyte to the interior region 140 thereof. Each of the electrolyte frames 112 is provided with four supply tubes 144 and four discharge tubes 146 of 3/16" diameter. Each of these tubes is about 15" long from the point where it enters the frame 112 to the point where it emerges into the common electrolyte conduit.

Metallic zinc is electroplated onto the exposed face of the backing plates 118 over an area approximately equal to the area of the porous plate 116. The electroplating of the zinc is carried out under conditions so as to deposit about 0.135 ounce of zinc per square inch of surface of the backing plate. A 20 weight percent solution of potassium hydroxide is continuously recirculated through the four cell stacks 102 by a pump 160 at the rate of about 0.48 cubic feet per second (for the full storage battery of 60 electrochemical cells connected in hydraulic parallel connection).

During discharge of the battery, the no load voltage of bers 120 by the air compressor 152 at about 15 p.s.i.g. and at a rate of about 0.17 cubic feet per second for the total battery. The temperature within the individual cell stacks is maintained at about 70° C. during the discharge of the battery via the dissipation of heat from the electrolyte stream by means of the radiator 154. A self-cleaning filter is employed in combination with the zinc oxide storage tank to accomplish the desired separation and storage. About 0.02 cubic feet per second of electrolyte is passed through the separation and storage means 166 during operation of the battery system. The temperature exterior of the zinc oxide storage tank approaches ambient temperature. The temperature of the electrolyte storage sump 158 is about cell temperature, i.e., about 70° C.

During discharge of the battery, the no lead voltage of each of the cells measures about 1.4 volts. At about 25 ma./sq. cm. the voltage is about 1.2 volts, and at 100 ma./sq. cm. the voltage is about one volt.

The electrochemical cells are preferably not discharged beyond reaction of about 90% of the metallic zinc. The 60-cell battery produces about 25 kilowatt hours of electrical energy per charging cycle, at a design power output of about 5 kilowatts. The battery has an energy density in excess of about 30 watt hours per pound and retains the energy density after repeated charge and discharge cycles.

The battery is charged by applying a voltage of about 30 volts with sufficient amperage to cause a current of about 50 ma./sq. cm. to flow through the cells. During charging, the circulation of electrolyte is maintained at about 0.48 cubic feet per second. Preferably, alternating current superimposed upon a direct current is employed during the charging of the battery. The charging is carried out until the zinc anodes have been rebuilt to an amount of about 0.135 ounce per square inch of surface area.

The battery system is considered to be well suited for applications of motive or traction power wherein power is supplied for a substantial portion of a day, and then recharging of the battery is carried out during off-hours so that the battery system is recharged and ready for operation by working time of the following day.

It is possible to employ an external cooling unit in place of a heat exchanger for cooling the electrolyte. Similarly, the arrangement of adjacent cells can be modified, for instance in such a way that each gas passage supplies oxygen-containing gas to two cathodes which form its walls, and each anode backing plate has zinc deposited on either side.

Shown in FIGURES 6, 7 and 8 is an alternative design of a rechargeable energy system 200 which eliminates the need for an air compressor or a blower and thus somewhat simplifies the overall operation of the system. This energy conversion system 200 employs a cell stack 202 made up of a plurality of electrochemical cells 204 which are generally rectangular in shape and which are held together in a stack by a plate and frame press (not shown). Each electrochemical cell includes a zinc anode, a nickel hydroxide cathode and an electrolyte supply and discharge frame which spaces the anode from the cathode.

The electrochemical reaction in these cells is basically similar to that described hereinbefore, resulting in the production of zinc oxide reaction products. However, in the system the oxygen is supplied from the nickel oxide active material, which is similar to that used in the nickel-cadmium battery and undergoes a similar electrochemical reaction. Although the actual chemical composition of the active material is not certain, it is a hydrated oxide of nickel which is reduced to a lowered oxide during discharge. In this specification, the active material is referred to generally as nickel hydroxide, with the material in its discharged state sometimes being termed nickelous oxide.

In FIGURE 6, an electrochemical cell 204 which would be located at one end of a cell stack 202 is illustrated. The cell 204 contains a relatively heavy end plate 206 which supports a zinc anode 208 that is electroplated thereupon. A nickel hydroxide cathode 210 occupies the opposite end of the electrochemical cell 204, and a rectangular electrolyte supply and discharge frame 212 spaces the anode from the cathode. Internal passageways within the frame 212 provide for the supply of liquid electrolyte to the electrochemical cell and for the discharge therefrom. A pair of gaskets 214, one on each side of the frame 212, assure that there is no leakage of liquid from the electrochemical cell 204.

The cathode 210, as perhaps best seen in FIGURE 7, is made up of a thin backing plate 218 which supports on one surface a sintered metal matrix 220 that contains the active cathode material. The sintered matrix is made of a suitable metal that has relatively good electric conductivity and that is suitably resistant to the alkaline environment of the electrochemical cell wherein it will be located. A matrix of sintered nickel particles is preferred, and the construction of such a sintered matrix may be carried out in any suitable manner whereby the desired porosity is obtained. For the incorporation within the sintered matrix of a desirably high amount of active material, the porosity of the sintered matrix should be between about 70 to 90 percent porous. To obtain porosities in this range, nickel carbonyl powder having a low apparent density may be used, for example as low as about one gram per cc. The sintering is usually carried out between about 600° C. and 950° C. Sintering may be preceded by coldpressing, or some pressure may be maintained upon the powder during sintering. As is well known, the temperature, pressure and time of sintering is determinative of the resultant porosity.

The sintered matrix 220 may be attached to the thin backing plate 218 at the time of sintering, or it may be formed separately and subsequently attached to the plate, as by welding. The sintered matrix 220 is filled with the active material using a suitable method known in the art. For example, it may be impregnated from a nickel solution in the form of nitrate or hydroxide. Preferably, sintered nickel matrices having a thickness between about 0.1 inch to 0.3 inch and which are about 80 to 85 percent porous are impregnated with sufficient nickel hydroxide to provide a loading of about 1 ma.h. (milliampere hour) for each 0.001 inch of thickness.

The thin backing plates 218 which support the cathode matrix 220 are preferably employed as bi-functional backing plates by using the opposite surface of the plates 218 to support the zinc anode 208 for the next electrochemical cell in line in the cell stack. By this arrangement, the backing plates 218 connect the adjacent electrochemical cells in the cell stack 202 in series electrical connection with one another by providing good electrical contact between the cathode of one cell and the anode of the next adjacent cell.

The electrolyte supply and discharge frame 212 is generally similar to the frames 112 described hereinbefore in this specification. Briefly, each frame 212 contains an entry supply tube 244 which enters the bottom of the frame and communicates with a lower elongated slot 236. Weep notches 238 provide communication between the lower slot 236 and the central void region 240 of the frame which serves as an electrolyte passageway between the anode and cathode of each individual cell. Weep notches 242 provide communication to an upper elongated slot 234 which leads to an exit tube 246.

In the illustrated arrangement, the electrochemical cells in the cell stack 202 are connected in parallel fluid connection with each of the supply tubes 244 being connected to a common supply conduit 248, and each of the discharge tubes 246 merging into a common discharge conduit 250. The electrolyte stream which exits from the cell stack 202 through the conduit 250 passes through a radiator 254 which serves to cool the electrolyte and remove some of the heat which is generated in the cell stack as a part of the electrochemical operation. The exit stream from the radiator 254 is discharged into an electrolyte storage sump 258 which contains an upper vent 260 to permit the escape of any gases generated during the electrochemical operation.

A pump 262 withdraws electrolyte from the sump 258 and continuously recirculates it through the cell stack 202 via the entrance conduit 248. An outlet conduit 263 from the pump 262 is branched into the entrance conduit 248 which re-enters the cell stack, and a smaller conduit 264 which carries about 5 to 10 percent of the volume of the electrolyte to a zinc oxide separation and storage means 266 similar to the earlier described means 166. In this manner, there is continual separation of the zinc oxide reaction products from a portion of the electrolyte stream. Thus, the concentration of the zinc oxide reaction products in the electrolyte being recirculated is maintained at a sufficiently low level that it can adequately remove the reaction products constantly being created in each cell.

During recharging, the operation of the system 200 is similar to the system 100 described above with the direction of current flow being reversed from that during discharge. Voltage about equal to about two volts for each of the electrochemical cells in series connection is employed. Circulation of the electrolyte during recharging is maintained at about the same rate as during discharge. The electrochemical reaction during recharging causes metallic zinc to be plated out on the end plate 206 and the backing plates 218 and changes the nickelous oxide active material to the higher oxide form. The depletion of the zinc oxide content of the electrolyte stream during recharging is compensated for by diversion of a similar portion of the stream through the zinc oxide storage means 266, thereby permitting the depleted electrolyte to pick up additional zinc oxide.

EXAMPLE II

A rechargeable energy conversion system 200 is assembled using 360 individual zinc-nickel hydroxide electrochemical cells 204 which are connected in series electrical connection into 24 separate 15-cell stacks. These 24 separate cell stacks 202 are connected in parallel electrical connection.

Each of the individual zinc nickel hydroxide cells is about 16" wide x 8" high and has a composite thickness of about 0.16 inch. The cathode 210 for each electrochemical cell 204 includes a porous matrix 216 made of sintered carbonyl nickel powder, which matrix is about 15¾" wide x 7¾" high x 0.1" thick. This porous matrix is welded along its periphery and at about one inch intervals over its face to a thin backing plate 218 of 0.005" mild steel.

The electrolyte supply and discharge frame 212 is injection-molded from polypropylene and is about 0.16 inch thick and formed with the internal slots 234 and 236 and notches 238 and 242 that provide inlets and outlets for electrolyte to the interior void region 240 thereof. Each of the electrolyte frames 212 is provided with a lower supply tube 244 and an upper discharge tube 246 of 3/16" equivalent diameter. Each of these tubes is about 15 inches long from the point where it enters the frame 212 to the point where is emerges into the common electrolyte conduit.

Metallic zinc is electroplated onto the exposed face of the backing plates 218 in the assembled cell stack over an area approximately equal to the area of the porous matrix 216. The electroplating of the zinc is carried out under conditions so as to deposit about 0.027 ounce of zinc per square inch of surface of the backing plate 218. A 20 weight percent solution of potassium hydroxide is continuously recirculated through the 24 cell stacks 202 by a pump 262 at the rate of about 1.6 cubic feet per second (for the full system of 360 electrochemical cells connected in hydraulic parallel connection).

The temperature within the individual cell stacks is maintained at about 50° C. during the discharge of the system via the dissipation of heat from the electrolyte stream by means of the the radiator 254. A self-cleaning filter is employed to accomplish the desired reaction products separation and storage. About 0.04 cubic feet per second of electrolyte is passed through the separation and storage means 266 during operation of the system. The temperature interior of the zinc oxide storage tank approaches ambient temperature.

During discharge of the system, the no load voltage of each of the cells 204 measures about 1.7 volts. At about 125 ma./sq. cm., the voltage is about 1.5 volts, at 300 ma./sq. cm., the voltage is about 1.2 volts.

The electrochemical cells 204 are preferably not discharged beyond reaction of about 90% of the metallic zinc. The 360-cell system produces about 30 kilowatt hours of electrical energy per charging cycle, at a design power output of about 18 kilowatts. The system has an energy density of about 30 watt hours per pound and retains this energy density after repeated charge and discharge cycles.

The system 200 is charged by applying a voltage of about 28 volts with sufficient amperage to cause a current of about 50 ma./sq. cm. to flow through the cells. During charging, the circulation of electrolyte is maintained at about 2.4 cubic feet per second. Preferably, alternating current superimposed upon a direct current is employed during the charging of the system. The charging is carried out until the zinc anodes have been rebuilt to an amount of about 0.027 ounce per square inch of surface area, at which time the zinc supply is fully consumed; charging is then continued for about 30% longer to fully charge the nickel hydroxide electrode.

The system is considered to be well suited for applications of motive or traction power wherein power is supplied for a substantial portion of a day, and then recharging is carried out during off-hours so that the system is recharged and ready for operation by working time of the following day. Moreover, the system described in this example is particularly suited to applications requiring periods of high power.

It can be seen that a zinc-nickel hydroxide energy conversion system has been provided which has a high power and energy density. The system is particularly adaptable for use as a motive power source for traction purposes, and for other purposes, where space and weight limitations restrict the use of conventional storage batteries and wherein the delivery of large amounts of power is important.

Various of the features of the invention are set forth in the following claims.

What is claimed is:

1. A rechargeable energy conversion process for a battery comprising at least one electrochemical rechargeable cell having a zinc electrode and a nickel hydroxide electrode which is spaced from said zinc electrode to define an electrolyte passageway therebetween for a liquid electrolyte, circulating liquid electrolyte through said electrolyte passageway and recirculating the electrolyte exiting from said electrochemical cell back to said cell, separating the zinc oxide reaction products formed during cell discharge from said electrolyte and storing said separated zinc oxide reaction products exterior of said electrochemical cell, recycling said zinc oxide reaction products back into said electrochemical cell and recharging said battery to plate metallic zinc upon said zinc electrode and oxidize said nickel hydroxide electrode to a higher hydroxide of nickel.

2. The invention in accordance with claim 1 wherein said nickel hydroxide electrode comprises a porous matrix of sintered nickel particles impregnated with nickel hydroxide.

3. The invention in accordance with claim 1 wherein said electrolyte is an aqueous hydroxide of an alkali metal and wherein the electrolyte is cooled after it exits from said cell and before it reaches said reaction products separation and storage means.

References Cited

UNITED STATES PATENTS

| | | | |
|---|---|---|---|
| 3,060,254 | 10/1962 | Urry | 136—28 |
| 3,247,024 | 4/1966 | Tamminen | 136—6 |
| 3,342,639 | 9/1967 | Harivel | 136—28 |
| 3,359,136 | 12/1967 | Merten et al. | 136—30 |
| 3,238,070 | 3/1966 | Porter | 136—160 |

ALLEN B. CURTIS, Primary Examiner

C. F. LEFEVOUR, Assistant Examiner

U.S. Cl. X.R.

136—30, 86, 160, 165

UNITED STATES PATENT OFFICE
CERTIFICATE OF CORRECTION

Patent No. 3,505,113      Dated April 7, 1970

Inventor(s) Ulrich Merten and John T. Porter II

It is certified that error appears in the above-identified patent and that said Letters Patent are hereby corrected as shown below:

Column 5, line 36, cancel the words "of the battery, the no load voltage of" and substitute therefor ", air is supplied to the plenum cham-".

SIGNED AND SEALED
SEP 8 - 1970

(SEAL)
Attest:

Edward M. Fletcher, Jr.
Attesting Officer

WILLIAM E. SCHUYLER, JR.
Commissioner of Patents